May 13, 1924.

C. E. WING 1,493,511

PROCESS OF MAKING ARTICLES OF HARD RUBBER DUST

Filed Oct. 6, 1923

INVENTOR.
Claude E. Wing
BY
Leo J. Matty
ATTORNEY.

Patented May 13, 1924.

1,493,511

UNITED STATES PATENT OFFICE.

CLAUDE E. WING, OF FLUSHING, NEW YORK, ASSIGNOR TO AMERICAN HARD RUBBER CO., OF NEW YORK, N. Y., A CORPORATION OF NEW YORK.

PROCESS OF MAKING ARTICLES OF HARD-RUBBER DUST.

Application filed October 6, 1923. Serial No. 666,897.

*To all whom it may concern:*

Be it known that I, CLAUDE E. WING, residing at Flushing, in the county of Queens and State of New York, have invented new and useful Improvements in Processes of Making Articles of Hard-Rubber Dust, of which the following is a full, clear, and exact description, such as will enable others skilled in the art to which it appertains to use the same.

This invention relates to the manufacture of hard rubber articles out of hard rubber dust and to a process of re-inforcing said articles; the invention further relates to a process of graining or coloring the surfaces of said articles, the object of the invention being to improve the strength and appearance of articles made out of hard rubber dust.

To the accomplishment of the above objects and to such others as may hereinafter appear, the invention comprises the use of re-inforcing sheets of vulcanized rubber, made from gum rubber and vulcanized, which can be inserted in the mold to cover the hard rubber dust, the whole being pressed and vulcanized in the mold to produce the finished article, the re-inforcing sheets of vulcanized rubber being grained or colored previous to being placed in the mold when it is desired to improve the appearance of the article.

Hard rubber dust is ordinarily obtained by grinding up hard rubber scrap, and is particularly applicable for use in irregular shaped molds where accurate size and shape is required together with rapid vulcanization as hard rubber dust vulcanizes much faster and can be removed from the mold much quicker than new unvulcanized rubber compound.

Articles made of hard rubber dust, while more easily vulcanized and removed from the mold in much less time, are not as strong as articles made from new unvulcanized rubber compound, nor are they capable of being grained to resemble wood for example by using different colored dusts.

In order to overcome this difficulty re-inforcing sheets of vulcanized rubber of various uniform colors or of variegated colors are cut to fit one or more sides of the mold in which the hard rubber dust is inserted to the required amount after which the same is heated and the mold compressed, after which the mold is cooled and the article removed.

The provision of the re-inforcing sheets of vulcanized rubber acts to materially strengthen the finished article and in addition lends itself to coloring or graining not possible by the use of hard rubber dust alone.

In the drawings:—

Figure 4:
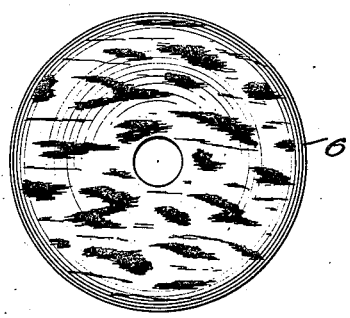
Figure 4 is a view of a telephone ear cap made in accordance with the invention.

Referring to the drawings, 1 designates the body of the mold, 2 the upper die, and 3 the lower die, which are arranged to be heated, forced together, and cooled, such means not being shown as they are of ordinary construction and well known. The upper and lower dies 2 and 3 are cut in the present instance to form telephone ear caps as shown in Fig. 4.

Figure 1:
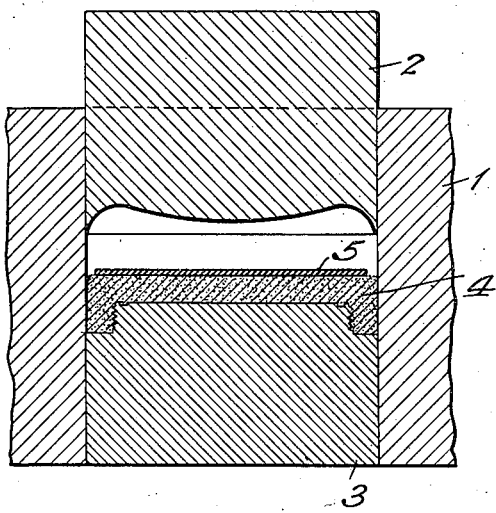
Figure 1 is a sectional view of a mold in open position showing the position of the hard rubber dust and a re-inforcing sheet of vulcanized rubber covering the same.
Figure 2:
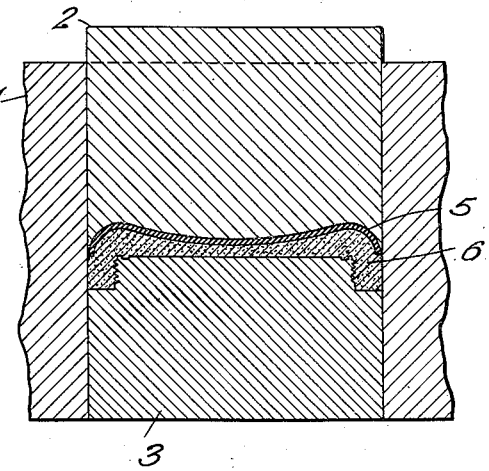
Figure 2 is a view similar to Fig. 1 showing the mold in closed position.
Figure 3:
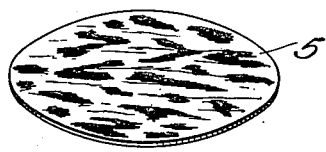
Figure 3 is a view of a thin piece of vulcanized rubber compound used in the mold.

In the present instance and in accordance with the present invention, hard rubber dust 4, to the required amount, is inserted to cover the lower die 3, and a reinforcing piece of vulcanized hard rubber 5 approximately one thirty second of an inch to one sixteenth of an inch thick, is placed over the top of the dust 4, the re-inforcing piece of hard rubber 5 being preferably less in diameter than the size of the mold. The mold is heated and the upper die 2 forced into position as shown in Fig. 2 and allowed to set, after which the mold is cooled and taken apart to remove the finished article or telephone ear cap 6.

The re-inforcing piece of vulcanized hard rubber 5 acts to materially strengthen the telephone ear cap 6 as the same acts to re-inforce or strengthen the body of the ear cap with which it is vulcanized, making the same less likely to break through hard usage.

The re-inforcing piece of vulcanized hard rubber can be made of different colored hard rubber compounds as taste may dictate, either to give a color different from the color of the dust used or to give the appearance of grained wood.

It is also to be noted that only one piece of hard rubber 5 is used to cover but one surface of the telephone ear cap 6, although if desired, another piece could be used to cover a part of the bottom of the cap, if thought advisable to further strengthen or ornament the same.

While the invention has been described with particular reference to details, the same is not to be considered as limited thereto, as many changes can be made and still fall within the scope of the invention set forth in the following claims:

What I claim is:—

1. The process of strengthening hard rubber articles made of hard rubber dust which comprises, facing one or more sides of a mold containing hard rubber dust with a re-inforcing sheet of vulcanized hard rubber compound, and vulcanizing the same together by applying heat and pressure.

2. The process of strengthening and ornamenting hard rubber articles made of hard rubber dust which comprises, facing one or more sides of a mold containing hard rubber dust with a re-inforcing sheet of vulcanized hard rubber compound previously colored or grained and vulcanizing the same together by applying heat and pressure.

In testimony whereof I have signed this specification in the presence of two subscribing witnesses.

CLAUDE E. WING.

Witnesses:
EDWARD WEISBERGER,
CASIMIR BOHDANORICZ.